Oct. 19, 1965          R. S. STORMS          3,212,411
FLUID TIGHT SELF-LUBRICATING CYLINDER ASSEMBLY
Filed Feb. 14, 1964
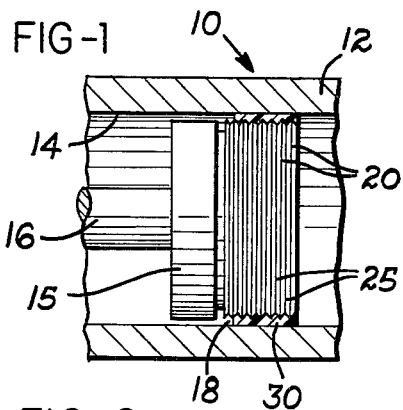
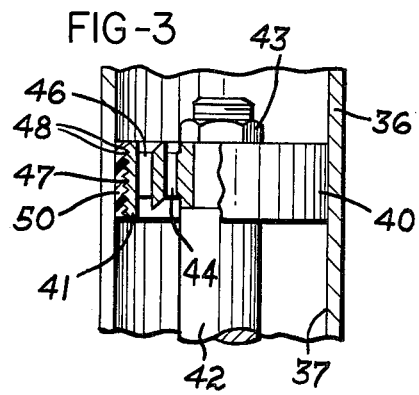
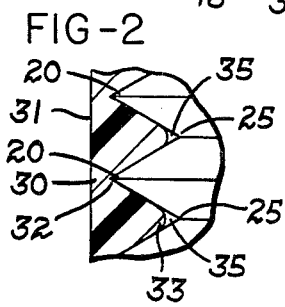
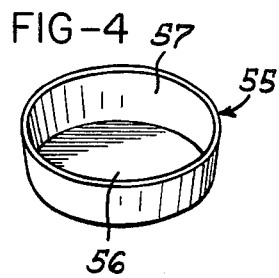
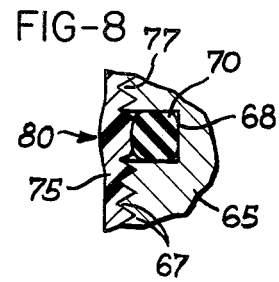
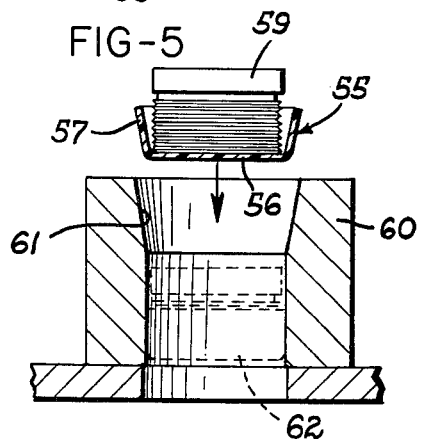
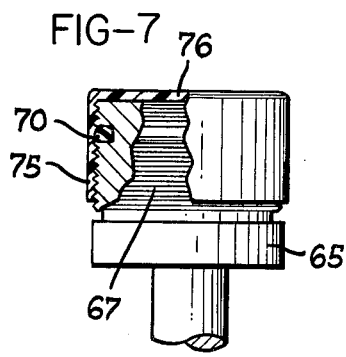
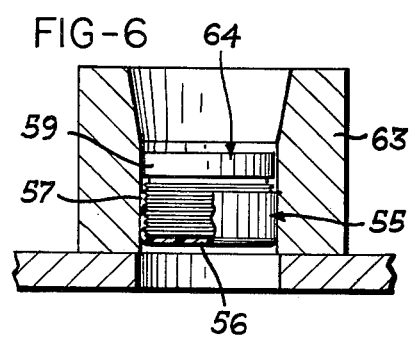
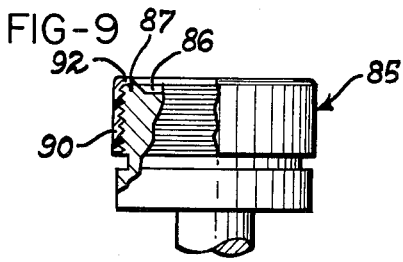
INVENTOR.
ROBERT S. STORMS
BY
*Marechal, Biebel, French & Bugg*
ATTORNEYS

United States Patent Office 3,212,411
Patented Oct. 19, 1965

3,212,411
FLUID TIGHT SELF-LUBRICATING CYLINDER ASSEMBLY
Robert S. Storms, Dayton, Ohio, assignor to The Duriron Company, Inc., Dayton, Ohio, a corporation of New York
Filed Feb. 14, 1964, Ser. No. 344,904
15 Claims. (Cl. 92—248)

This invention relates to piston and cylinder assemblies, and more particularly to an improved combination of a piston and cylinder wherein a fluid tight seal is provided therebetween by a fluorocarbon resin member having a relatively low coefficient of friction.

Piston and cylinder assemblies are frequently used in fluid compressors and air compressors, shock absorbers, hydraulic and pneumatic cylinders as well as in servo mechanisms. In the case of compressors, and particularly refrigeration compressors, the outer surface of the metallic piston usually includes a radially split metallic seal ring received in an annular groove generally located along the outer periphery of the piston and near the top thereof. The seal between the piston and cylinder wall is established by the resilient metal piston ring which runs in contact with the cylindrical surface of the cylinder bore. Frequently, lubricants such as oil and the like are utilized and assist in providing a seal as well as lubricating the relatively movable parts.

In other type piston and cylinder assemblies, for example in a shock absorber it has been the practice to utilize a continuous nylon seal ring which is fitted in an annular groove formed in the outer surface of a metallic piston and which provides a bearing surface for movement of the piston relative to the metallic cylinder. The nylon member exhibits a tendency to swell when it absorbs water, resulting in a squeaky or hard action by the shock absorber. Additionally, nylon being a thermoplatsic material exhibits a tendency to soften at temperatures of about 400° to 425° F. resulting in what is known as "blow out" of the nylon piston ring. Additionally, there may be a substantial change in the dimensions of the nylon member upon absorption of water which causes the nylon member to expand and increase its rate of wear. After such a seal ring has dried, it shrinks back slightly, and because of the excessive wear encountered during the period in which it contained absorbed moisture, there is a relatively poor fit between the nylon seal ring and the cylindrical wall of the cylinder thereby allowing fluid to pass between the piston and cylinder which results in erratic performance of the shock absorber at least until the nylon absorbs sufficient water to provide a tight fit between the piston and cylindrical walls.

In the case of refrigeration compressors, the piston ring is radially cut, and generally the practice is to match the piston with the cylinder, and to utilize an oil lubricant which also forms a secondary seal cooperating with the seal provided by the ring which is carried by the piston. During upward movement of the piston, the ring is seated against the lower shoulder of the annular groove, thus providing a space between the top surface of the ring and the top shoulder of the annular groove. During downward movement of the piston, the ring is seated against the upper shoulder of the groove with a small space between the lower surface of the ring and the lower shoulder of the groove. Generally, the rings are not completely seated so that there is an annular space between the inner periphery of the ring and the base of the ring groove. A point is reached during movement of the piston when the piston ring is evenly spaced from each of the shoulders of the groove for a very brief interval thereby allowing the medium being compressed, as well as the lubricant, to pass between the upper shoulder of the groove and the upper surface of the ring and around between the inner surface of the ring and the base of the groove, and then between the bottom surface of the ring and the bottom shoulder of the groove and out between the cylinder and piston walls. This pattern of leakage usually occurs during the start of the upward stroke of the piston, and during the start of the downward stroke of the piston the leakage path is reversed allowing the lubricant to move up into the compression chamber. The result is a reduction in volumetric efficiency, or the rate at which the pump or compressor should operate as opposed to its actual measured operation. Generally, in the case of refrigerator compressors, the pistons are die cast and are porous at the top or head resulting in gas leakage through the head.

The leakage of lubricant into the compression chamber results in mixture of oil with air in the case of an air compressor, and oil with the refrigerant in the case of a refrigeration compressor which may coat members which come in contact with the compressed air or refrigerant. In the case of a refrigeration unit, the oil coating is usually deposited on the heat exchanger and effects the heat transfer or K factor.

Another characteristic of a standard metal piston ring is that it must be split to allow assembly into the piston ring groove. The gap between the ends of the ring forms a leakage path which increases as the material is worn off the outer surface of the ring.

In accordance with the present invention an improved piston and cylinder assembly is provided including an improved sealing member between the outer wall of the piston and the bore of the cylinder. The sealing member is preferably of polytetrafluoroethylene (PTFE), a material having a relatively low coefficient of friction, a relatively high coefficient of thermal expansion, and is relatively chemically inert and impervious to liquids. The PTFE sealing member provides relatively low drag and will accommodate high cylinder pressures with little or no leakage. Further, the seal material is fixed either to the bore of the cylinder or the outer surface of the piston in such a fashion as to accommodate the changes in dimension attributable to the relative differences in coefficient of thermal expansion between the PTFE member and the metal constituting the piston and cylinder members.

Polytetrafluoroethylene or PTFE is available commercially under the trademark Teflon and is relatively impermeable to liquids and absorbs unusually small amounts of water, in the order of 0.0005% when tested by ASTM method D570–42. It is stable under temperatures varying over a substantial range, for example 600° F. to less than −100° F. PTFE also exhibits a coefficient of thermal expansion which is significantly higher than the coefficient of thermal expansion of several metals, and most resins and polymers.

Some of these characteristics are desirable from the standpoint of fabrication of seal elements which are self-lubricating, however other properties of the material may raise difficulties in connection with the fabrication, manufacture and use of a seal element composed in part or entirely from PTFE.

While identified as a thermoplastic resin PTFE does not behave as a true thermoplastic, and the processing thereof is somewhat different from the processing generally utilized with true thermoplastic resins.

One of the common procedures in forming elements of PTFE is to compress the virgin powder by compaction in a mold to form a mechanically bonded intermediate product identified as a "preform." The preform has a low level of mechanical resistance and may be easily destroyed since the individual particles of powder are held together by mechanical as opposed to chemical forces. The preform is generally heated in or out of the mold at an elevated temperature for a period of time sufficient to coalesce or chemically bond together the individual compacted particles of the powder into a coherent mass having a shape virtually identical to the shape of the preform. The final shape of the sintered article is determined primarily by the configuration of the mold used in forming the preform.

Sintered PTFE products exhibit a tendency to cold flow under the application of a deforming load, and the sintered product also has a plastic memory which tends to cause the product to return to its original sintered shape when heated. This characteristic is of importance in designing and in the use of products which have been hot formed subsequent to the sintering operation to alter the configuration thereof. "Hot forming" or other working of the sintered product, as for example by "cold forming" may change the physical shape of the sintered article, but upon exposure to an elevated temperature, the worked sintered product tends to revert or recover to some extent, to the configuration it had after the sintering operation. The extent to which this reversion or recovery occurs depends in large measure to the temperature to which the worked sintered product is exposed. For example, a part which has been sintered and then hot or cold worked to change its shape may be caused to return to its original sintered shape by heating the part to about 700° F. while the part is unconfined. Heretofore, it has generally been considered that the tendency of a sintered worked plastic piece to revert to its original shape was a disadvantage which limited the potential application of PTFE materials, and required arrangements of structural elements designed to maintain the plastic piece confined so as to prevent, as far as possible, reversion attributable to "secondary plastic memory" which results from the hot and cold working occurring after the sintering operation.

One source of difficulty associated with seal elements of PTFE is the dimensional change which the element undergoes in response to increase in temperature. The dimensional changes are in part attributable to the effects of secondary memory, previously described, as well as the inherent changes in dimension resulting from its coefficient of thermal expansion. For example, PTFE has a coefficient of thermal expansion which is eight to ten times greater than most grades of steel, that is, the PTFE member will expand eight to ten times greater than will a steel member exposed to substantially the same temperature conditions.

By the principles of the present invention, a seal member is provided for use in piston and cylinder assemblies which is relatively inexpensive and produced by a relatively simple and improved method, and which eliminates the necessity of a lubricant and which also provides a relatively fluid tight seal over a substantial range in temperature. Additionally, the sealing member is affixed to one of the surfaces, preferably the outer surface of the piston in such fashion that there is little if any axial movement of the seal element relative to the piston during the stroke of the piston, particularly that portion of the stroke when the piston is changing its direction of movement.

Thus, it is a primary obect of the present invention to provide a piston seal ring which will accommodate high cylinder pressures with little or no leakage and which is self-lubricating and has low drag.

Another object of the present invention is the provision of a fluorocarbon resin seal member for a piston and cylinder assembly which is inexpensive to make and which is assembled in fixed relationship to the surface of one of these members, preferably the piston, in such a manner as to provide low drag between the relatively movable surfaces and which provides a relatively fluid tight seal therebetween over a substantial range of temperatures.

Still another object of the present invention is the provision of an improved piston and cylinder assembly utilizing a fluorocarbon seal member wherein spaced high pressure seal areas are provided between the relatively movable surfaces and wherein expansion spaces are provided to accommodate movement of the material of the seal member in response to increase in temperature.

A further object of the present invention is the provision of a cylindrical piston and cylinder assembly wherein a fluorocarbon resin sealing member is provided between the relatively movable surfaces and held in fixed relationship to one of these surfaces by a plurality of axially spaced annular generally V-shaped continuous notches and ridges thereby preventing axial movement of the seal member with respect to the surface to which it is fixed while simultaneously providing a series of axially spaced high pressure and low pressure seal areas, and wherein there is provided multiple expansion chambers to accommodate expansion of the sealing member in response to elevation in temperatures.

A further object of the present invention is an improved method of assembling a fluorocarbon resin seal member either to the surface of a piston or cylinder whereby the seal member is maintained in fixed axial relationship thereto, and which is assembled in such a fashion as to provide efficient sealing over a substantial range of temperatures.

Other objects and advantages of the present invention will be apparent from the following description, the accompanying drawing and the appended claims.

In the drawing—

FIG. 1 is a view partly in section and partly in elevation of a cylinder and piston assembly constructed in accordance with the present invention;

FIG. 2 is an enlarged fragmentary view showing the details of the mounting of the seal member on its supporting structure in accordance with the present invention;

FIG. 3 is a view partly in section and partly in elevation with portions thereof broken away showing the arrangement of a piston and cylinder assembly for a shock absorber constructed in accordance with the present invention;

FIG. 4 is a view in perspective of a cup-shaped seal blank which is used to provide sealing member in accordance with the present invention;

FIG. 5 is a schematic view showing the sequence involved in fixing the seal member to its supporting surface in accordance with the present invention;

FIG. 6 is a view illustrating the cooling operation by which the sealing member is affixed to its supporting surface;

FIG. 7 is a view partly in section and partly in elevation with portions thereof broken away showing a refrigeration compressor in accordance with the present invention;

FIG. 8 is an enlarged fragmentary view partly in section and partly in elevation of a portion of the refrigeration compressor shown in FIG. 7; and FIG. 9 is a view partly in section and partly in elevation with portions thereof broken away showing another form of piston assembly constructed in accordance with the present invention.

Referring to the drawing, which illustrates preferred embodiments of the present invention, FIG. 1 shows a piston and cylinder assembly 10 including a cylinder 12 having a cylindrical bore surface 14 which receives a piston 15 while connected to the piston 15 is a piston rod 16. The radial dimensions of the outer cylindrical surface of the piston are coordinated and correlated with the radial dimensions of the cylindrical bore surface to provide a relatively small annular clearance 18 therebetween.

Referring to FIG. 2, one of the opposed surfaces, preferably the outer surface of the piston 15 includes a plurality of annular axially arranged continuous crests 20, and between each crest are a plurality of relief areas or grooves 25 which are preferably annular in shape. Received in the clearance space 18 between the opposed cylindrical surfaces of the bore and piston is a relatively thin sealing member 30 of fluorocarbon material, such as PTFE which is fixed to the surface which includes the annular crests and grooves. The sealing member 30 is in the form of a relatively thin sleeve and includes one surface 31 which is relatively smooth, and a second surface which faces the grooved and crested surface of the plug and which includes a complementary pattern of grooves 32 and crests 33.

The crests 33 of the sleeve are received within the grooves 25 of the outer surface of the piston while the grooves of the seal member 30 receive the crests 20 of the outer surface of the piston. The grooves 25 include root portions which are spaced a small distance from the crests 33 of the seal member to provide a plurality of expansion spaces 35 which are preferably continuous and annular, and arranged in axially spaced relation between the crests 20 of the outer surface of the piston. The crests 20 and the grooves 25 are preferably axially arranged, continuous and V-shaped in section, as shown, to provide a wedge type fit between the grooves and crests of the mating surfaces of the sleeve and piston.

The radial dimensions of the crests 20 and grooves 25 are coordinated and correlated with the radial dimensions of the grooves 32 and the crests 33 of the seal member 30 so that the crests 20 project into the sleeve or seal member at least a distance of about 20% of the cross-sectional thickness thereof. That is, the cross-sectional thickness dimension of the portions of seal member 30 facing the crests 20 on the piston is greater than at least 20% of the thickness of the remaining or crested portions 33 of the sleeve or seal member 30. In actual practice, the crests 20 project into the sleeve between about 50% to 80% of the cross-sectional thickness thereof as measured in the areas of the crests 33.

Referring again to FIG. 1, the sleeve or seal member 30 is received in the portion of the clearance 18 between the bore 14 and the notched and grooved surface of the piston 15 to provide a seal element which will accommodate high cylinder pressures with little or no leakage and which posses low drag. The crests 20 and the grooves 25 are preferably integral with the outer surface of the piston and may be provided thereon by a cutting or other machining operation, or cast thereon during formation of the piston. The notches 20 cooperate with the seal member 30 and the bore to provide a plurality of axially spaced generally annular continuous high pressure sealing areas and also operate to maintain the seal member fixed axially with respect to that member to which the seal element is stationary, for example, the piston as in FIG. 1.

The grooves 25 cooperate with the sealing member 30 and the bore to provide a plurality of axially spaced low pressure sealing areas, and since the crests 33 on the seal member do not completely fill the grooves 25, a plurality of annular axially aligned expansion spaces are also provided. The low pressure sealing areas between the piston and the bore are those areas generally radially aligned with the expansion spaces. These low pressure sealing areas operate to reduce the force required to move the piston relative to the bore, while the high pressure sealing areas, or those areas radially aligned with the crests 20 operate to provide efficient sealing. In effect, the spaced axially aligned high pressure sealing areas act as individual piston rings which are maintained in sealing engagement with the piston and bore during relative movement of these two members.

As will be noted from FIGS. 1 and 2, the notches and grooves in the surface of the piston and along the inner surface of the seal member are V-shaped, with notch 32 of the seal member receiving ridge or crest 20 of the piston to provide a fluid tight seal between the corresponding mating surfaces of the groove in the seal member and the ridge on the piston. During movement of the piston relative to the bore, the seal member remains in sealing engagement since the groove 32 is substantially completely filled by the crest 20 and the mating surfaces are at an angle with respect to the axis of the bore. By substantially filling the grooves in the sleeve member, and by providing angularly disposed mating surfaces, a wedging action is achieved which substantially eliminates any leakage between the seal member and the surface with respect to which it is stationary. Accordingly, each notch on the piston or bore wall coacts with each groove in the seal member to provide multiple sealing surfaces which resist leakage therebetween regardless of the relative position of the piston and seal member, and the leakage path between the piston and seal ring as was described previously in connection with the prior art structure is substantially eliminated.

Referring to FIG. 3, a portion of a conventional shock absorber is shown including cylinder 36 having a cylindrical bore 37 which receives the piston assembly 40. The piston assembly includes a piston 41 and a piston rod 42, the rod being secured to the piston by a bolt 43 in a conventional manner. The interior of the piston is provided with multiple small apertures 44 and 46 for allowing controlled passage of fluid therethrough during operation of the shock absorber, as is well known in the art.

The outer surface 47 of the piston 41 is provided with a multiplicity of annular grooves and crests generally designated 48 similar to the grooves and crests previously described in connection with FIGS. 1 and 2. A relatively small clearance space is provided between the outer grooved and crested surface of the piston and the bore 37 for receiving the sealing member 50 whose outer surface is substantially smooth and continuous and whose inner surface includes a complementary pattern of grooves and crests for receiving the grooves and crests on the outer surface of the piston.

During operation of the shock absorber, movement of fluid through the holes 44 and 46 operates to increase the temperature of the piston in the order of 530° F. at which point a temperature equilibrium is reached. With shock absorbers utilizing nylon as a seal element, exposure to temperatures in the range of 400° to 425° F. resulted in blow out of the seal element as previously described. A blow out test conducted with a shock absorber wherein a PTFE seal member was affixed to the piston as shown in FIG. 3 indicated that at temperatures in the order of 530° F. the seal element remained in sealing engagement on the piston. Further, a shock absorber constructed with a seal member as shown in FIG. 3 was run for one million cycles to determine the changes in dimension thereof attributable either to wear, liquid absorption or distortion due to increase in temperature. The dimension in two planes of the piston and seal members prior to the test was 0.9995 and 1.0002 inches. After the test of one million cycles, the dimension in substantially the same two planes was 0.9998 and 1.0001 inches respectively indicating that there had been some flow of the material but no substantial change in dimensions. While flow of PTFE materials is generally considered a disadvantage, here the flow of the material as indicated by the changes in radial dimensions established that the seal member exhibited a tendency to become matched to the bore.

The features of the present invention may be understood with respect to procedures utilized in providing a seal member on either of the bore or piston surface, and preferably the latter. Referring to FIG. 4, a relatively thin flat sheet of PTFE material having a thickness of between about .010 inch to .050 inch is hot or cold formed to provide a seal blank 55 which is in the shape of a cap including a base portion 56 and a continuous generally annular vertically extending wall section 57. The seal blank 55 is assembled over a piston 59 as shown in FIG. 5, the piston having on at least a portion of the outer surface thereof a plurality of notches and grooves as previously described. If the depth of the notches is in the order of .007 inch a seal blank may be utilized having a wall thickness of .010 inch so that the thickness of the seal member between the wall of the cylinder and the crest is of the order of .003 inch. The piston 59 with the cap or seal blank 55 assembled thereover is then inserted into a heated mold 60 which includes a slightly flared or tapered entrance portion 61, and which in effect forms a sizing tube which forces the PTFE sheath radially inwardly to force the crests of the piston to bite into the sheath.

By providing a gradually tapered entrance portion 61 for the sizing tube, the crests of the piston will bite into the PTFE seal blank before the axial force is so great that it tears the seal blank apart.

The thickness of the blank and the depth of the grooves, as well as the radial dimensions of the non-tapered surface of the sizing tube are proportioned so that the root sections of each groove are not completely filled by the seal blank thereby providing the expansion spaces 35 previously described.

The sizing tube 60 may be heated to the order of 600° F., and the piston 59 with the assembled blank 55 thereon are maintained within the sizing tube for a period of time sufficient to hot form the seal blank around the piston. Thus positioned within the tube 60, the piston and sheath would assume a configuration shown in the phantom lines 62. After a predetermined period of time which is dependent upon the cross-sectional thickness dimension of the sheath, and the depth of the grooves, the piston with the seal element assembled thereon is removed from the heated sizing tube and cooled while the sheath is maintained in a confined condition. It has been found satisfactory to maintain the assembled piston and seal blank within the hot sizing tube for a period of time sufficient to allow the temperature thereof to reach somewhere in the range of 400° to 550° F., and as a general rule the assembled unit should be heat sized at a temperature somewhat greater than that to which it will be exposed during operation.

The diameter of the sizing tube is somewhat smaller than the diameter of the bore into which the piston and seal members are ultimately received, and it has been found satisfactory to utilize a sizing tube which is between .001 inch and .010 inch smaller in diameter than the diameter of the cylindrical bore, again depending on the initial thickness of the seal blank and the depth of the groove on the piston wall.

After treatment in the heated sizing tube 60, the heated and assembled piston and seal blank are immediately introduced into a cooling tube 63 of the type shown in FIG. 6 wherein the seal element is maintained in a confined condition with respect to the grooved and notched surface of the piston. After cooling, the unit 64 is removed from the cooling tube 63 and is ready for whatever finishing operations may be needed, for example cutting the base 56 if an annular sealing member is desired as opposed to a piston assembly in which the head is also covered with PTFE material.

The seal blank 55 exhibits a primary memory of its planar shape, and a secondary memory of its cup or seal blank shape. If the assembled seal blank and piston were removed from the heated sizing tube 60 and allowed to cool in an unconfined condition, the seal blank would pull away from the surface of the piston and assume a configuration substantially similar to that shown in the full lines of FIG. 5. By cooling the seal blank while confined, it remains in close contact with the grooved outer surface of the piston rod, and when assembled into a bore, the seal material is compressed so that the seal member assumes a position with respect to the grooved surface similar to that shown in FIG. 2.

Following formation of the sheathed piston, it is assembled into a bore, and need not be matched thereto as is the case with matched piston and cylinder assemblies as used for example in refrigeration compressors.

During operation of the piston and cylinder assembly, the temperature of the seal element increases and the seal element exhibits a tendency to return to its planar configuration, or the configuration it possessed as a seal blank. As it does so, it exerts a radially outward force which tends to increase sealing pressure slightly. Since it is confined between the bore and notched or grooved surface of the piston, it is unable actually to move radially outwardly, and additionally if the temperature to which it is exposed is less than the temperature at which the sheath was assembled to the piston during the hot sizing operation, there is little change in dimension due to the tendency of the seal element to recover.

Another change in dimension which tends to occur is that due primarily to the differences in coefficient of thermal expansion between the metal members constituting the bore and piston and that of the PTFE. The PTFE member will expand at a rate greater than the metal members, and accordingly the provision of expansion spaces 35 operates to maintain a uniform outer dimension by allowing the PTFE member to expand inwardly into the small annular spaces, thereby preventing axial extrusion of the material between the bore and piston.

The following example will illustrate the above point. Assume a piston not having the expansion spaces 35 is assembled into a cylinder and operated, that is, the grooves on the piston surface are substantially filled by the seal member. As the temperature of the piston and cylinder increase, the sealing member will expand at a rate greater than that of the adjoining metal members and will also, to some extent, tend to assume the configuration shown in FIG. 4. Since it is confined between the wall of the piston and the bore and the cylinder, it is unable to flare out, however it can expand and since there is no room provided for expansion, the material of the seal member will tend to extrude axially between the piston and the bore. After operation of the piston and cylinder assembly, and it has cooled to a lower temperature, the sealing member will tend to contract, however it is compressed between the piston and the bore, and the notches and grooves will back it in the expanded condition preventing the extruded material from flowing back between the bore and piston, so that the sealing member does not provide an efficient seal until it is again elevated to a temperature of the order of its operating temperature.

In accordance with the present invention, expansion spaces are provided into which the PTFE material may move or expand during increases in temperature therefore preventing axial extrusion. As the temperature is decreased, the PTFE member will contract slightly again establishing the expansion spaces while maintaining a substantially fluid tight seal. Any subsequent increase in temperature is compensated for by the annular expansion spaces provided at the root of each groove in the metal surface.

The principles of the present invention may also be utilized with refrigeration compressors shown for example in FIG. 7 and including a piston 65 having a multiplicity of grooves and notches 67. The upper portion of the piston is provided with the U-shaped O-ring groove 68 which receives a resilient O-ring type sealing member 70. Positioned in sealing engagement and received by the notched outer surface of the piston is a PTFE sealing member 75 which is generally cup-shaped and includes a portion 76 which covers the piston head.

In addition to the high pressure seal areas formed opposite the ridges 77, as shown in FIG. 8 there is a continuous annular resilient high pressure seal area generally designated 80 located opposite the resilient member 70.

This particular structure offers the advantage of eliminating lubricants which may be compressed with the refrigerant and introduced into the heat exchanger. Also, since the piston head is covered by a fluid impervious material, there is no leakage or loss of refrigerant through the head. The resilient high pressure seal area 80 cooperates with the other high pressure seal areas 77 to provide efficient sealing between the piston and cylinder. As was the case with the assemblies described in connection with FIG. 2, provision is made for expansion spaces which are preferably continuous annular spaces provided by the V-shaped notches, with the V-shaped crests operating to provide axially spaced continuous high pressure seal points as previously described.

The assembly of the sealing member and piston shown in FIGS. 7 and 8 follows generally the steps previously described except that the resilient member is placed into the groove prior to the sizing operation, and the cap or portion 76 is not cut or removed during the finishing operation.

The piston 85 shown in FIG. 9 is a somewhat modified form and includes a recessed head 86 which defines an axially extending shoulder 87. The outer surface of the piston is notched and grooved as previously described in connection with FIGS. 1 and 2, and affixed thereto is a sealing member 90 which includes a radially inwardly extending skirt portion 92 which engages the face of the shoulder 87 as shown. This particular type piston may be used for example in an air compressor or the like and includes the expansion spaces, high pressure seal areas and low pressure seal areas previously described.

The piston and cylinder assemblies of the present invention offer the advantage of eliminating lubrication and providing a fluorocarbon resin sealing member, preferably PTFE which is assembled to the bore of the cylinder, or the outer surface of the piston. Provision is made for expansion spaces allowing movement of the fluorocarbon resin material to compensate for changes in dimension which tend to take place in response to changes in temperature. It is possible in accordance with the present invention to secure the seal member to the bore following generally the same procedures outlined except that a heated rod is inserted into the bore to force the seal member radially outward, followed by the use of a second rod which maintains the seal member in a confined condition while it cools.

It is also possible in accordance with the present invention to utilize a resilient secondary seal member with any of the structures shown, or a plurality of axially spaced resilient seal members, if desired.

While the forms of the device, and the method herein described constitute preferred embodiments of the invention, it is to be understood that the invention is not limited to these precise forms of device and method, and that changes may be made therein without departing from the scope of the invention as defined in the appended claims.

What is claimed is:

1. In combination, means defining a hollow cylindrical bore, a cylindrical piston received in said bore for relative reciprocating movement therein, the dimensions of said piston being coordinated and correlated with the dimensions of said bore to provide a relatively small annular clearance between the opposed surfaces thereof, a relatively thin sealing member of fluorocarbon material having a relatively low coefficient of friction received in at least a portion of the clearance between the opposed surfaces of said bore and said piston and in sealing engagement therewith, said sealing member being secured against axial movement with respect to one of said surfaces, means integral with said one surface for providing in cooperation with said sealing member a plurality of axially spaced generally annular continuous high pressure sealing areas, and second means cooperating with said one surface and said sealing member for providing spaced low pressure sealing areas and expansion spaces into which the material of said sealing member may move in response to increases in temperature.

2. The combination set forth in claim 1 including means associated with said one surface and cooperating with said sealing member to provide at least one annular continuous resilient high pressure seal area.

3. In combination, means defining a hollow cylindrical metal bore, a cylindrical metal piston received in said bore for relative reciprocating movement therein, the dimensions of said piston being coordinated and correlated with the dimensions of said bore to provide a relatively small annular clearance between the opposed surfaces thereof, a sealing member of material having a relatively low coefficient of friction, low moisture adsorption, relatively low permeability and a coefficient of thermal expansion greater than that of the metal of said bore and piston received in at least a portion of the clearance between the opposed surfaces of said bore and said piston and in sealing engagement therewith, said sealing member being secured against axial movement with respect to one of said surfaces, means integral with said one surface for providing in cooperation with said sealing member a plurality of axially spaced generally annular continuous high pressure sealing areas, second means cooperating with said one surface and said sealing member for providing spaced low pressure sealing areas and expansion spaces into which the material of said sealing member may move in response to increases in temperature, and the cross-sectional thickness dimension of said sealing member being between 0.010 and 0.050 inch.

4. In combination, means defining a hollow cylindrical bore, a cylindrical piston received in said bore for relative reciprocating movement therein, the dimensions of said piston being coordinated and correlated with the dimensions of said bore to provide a relatively small annular clearance between the opposed surfaces thereof, a relatively thin sealing member of fluorocarbon material having a relatively low coefficient of friction received in at least a portion of the clearance between the opposed surfaces of said bore and said piston and in sealing engagement therewith, said sealing member being secured against axial movement with respect to said bore surfaces, crest means integral with said bore surface for providing in cooperation with said sealing member a plurality of axially spaced generally annular continuous high pressure sealing areas, and second means providing a plurality of relief areas cooperating with said bore surface and said sealing member for providing spaced low pressure sealing areas and expansion spaces into which the material of said sealing member may move in response to increases in temperature.

5. In combination, means defining a bore having a hollow cylindrical inner surface, a piston having an outer cylindrical surface, the dimensions of said piston surface being coordinated and correlated with the dimensions of said bore surface to provide a relatively small annular clearance therebetween, means defining a plurality of spaced relief areas on at least a portion of one of said surfaces, a plurality of axially arranged continuous annular crests on the surface of said one surface, a relatively thin sleeve of fluorocarbon material having a relatively low coefficient of friction received in the clearance between the opposed cylindrical surfaces of said bore and in sealing engagement therewith, the surface of said sleeve facing said crested surface including a plurality of grooves receiving said crests of said one surface, said sleeve including raised portions received in said relief areas in said one surface, the relief areas in said one surface including root portions spaced from the raised portions of said sleeve to provide a plurality of chambers for expansion of said fluorocarbon material due to increase in temperature thereof, and said relief areas and crests in said one surface cooperating with the raised portions and grooves in said sleeve to provide spaced low pressure and annular high pressure sealing areas between said cylindrical surfaces while preventing axial movement of said sleeve with respect to said one surface.

6. In combination, means defining a bore having a hollow cylindrical inner surface, a piston having an outer cylindrical surface, the dimensions of said piston surface being coordinated and correlated with the dimensions of said bore surface to provide a relatively small annular clearance therebetween, a plurality of alternate annular grooves and crests on at least a portion of said piston surface, a relatively thin sleeve of fluorocarbon material having a relatively low coefficient of friction received in at least a portion of the clearance between the opposed cylindrical surfaces of said bore and said piston and in sealing engagement therewith, the surface of said sleeve facing said grooved and crested surface including a plurality of grooves receiving said crests of said piston surface, the crests in the surface of said sleeve being received in the grooves in said piston surface, the grooves in said piston surface including root portions spaced from the crests in said sleeve to provide a generally annular chamber for expansion of said fluorocarbon material due to increase in temperature thereof, and said grooves and crests in said piston surface cooperating with the crests and grooves in said sleeve to provide annular spaced low and high pressure sealing areas respectively between said cylindrical surfaces while preventing axial movement of said sleeve with respect to said piston surface.

7. In combination, means defining a bore having a hollow cylindrical inner surface, a piston having an outer cylindrical surface, the dimensions of said piston surface being coordinated and correlated with the dimensions of said bore surface to provide a relatively small annular clearance therebetween, a plurality of alternate annular continuous V-shaped grooves and crests on at least a portion of said piston surface, a relatively thin sleeve of fluorocarbon material having a relatively low coefficient of friction received in the clearance between the smooth cylindrical surface of said bore and said crested and grooved surface of said piston and in sealing engagement therewith, the surface of said sleeve facing said piston surface including a plurality of grooves receiving said crests of said piston surface, the crests in the surface of said sleeve being received in the grooves in said piston surface, the grooves in said piston surface including root portions spaced from the crests in said sleeve to provide a continuous annular expansion chamber for expansion of said fluorocarbon material due to increase in temperature thereof, the cross-sectional thickness dimension of said sleeve in the areas of the crests on said piston being greater than at least 20% the thickness of the remaining portion of said sleeve, and said grooves and crests in said piston surface cooperating with the crests and grooves in said sleeve to provide annular spaced low and high pressure sealing areas respectively between said cylindrical surfaces while preventing axial movement of said sleeve with respect to said piston surface.

8. In combination, means defining a hollow cylindrical bore, a cylindrical piston received in said bore for relative reciprocating movement therein, the dimensions of said piston being coordinated and correlated with the dimensions of said bore to provide a relatively small annular clearance between the opposed surfaces thereof, a relatively thin sealing member of fluorocarbon material having a relatively low coefficient of friction received in at least a portion of the clearance between the opposed surfaces of said bore and said piston and in sealing engagement therewith, said sealing member being secured against axial movement with respect to said piston surface, means integral with said piston surface for providing in cooperation with said sealing member a plurality of axially spaced generally annular continuous high pressure sealing areas, second means cooperating with said piston surface and said sealing member for providing spaced low pressure sealing areas and expansion spaces into which the material of said sealing member may move in response to increases in temperature, and said sealing member being generally cup-shaped and covering said piston head for providing a relatively fluid impermeable barrier enclosing said piston head and a portion of the adjacent outer surface thereof.

9. The combination set forth in claim 8 wherein said piston includes a generally annular groove near the head thereof, resilient seal means received in said groove and cooperating with said sealing member to provide an annular continuous resilient high pressure seal area.

10. The method of assembling a fluorocarbon seal element to one of the opposed surfaces of a piston member and a cylinder member comprising the steps of forming a plurality of axially spaced continuous crest areas on a surface of one of said members, forming a plurality of grooved areas on said surface, forming a seal blank of fluorocarbon material dimensioned to be received by said grooved and crested surface, assembling said seal blank in overlying relation with said grooved and crested surface, heating said seal blank in overlying relation with said surface while applying a force to cause said seal blank partially to fill the grooves and causing said crests to be embedded in the material of said seal blank, and cooling said seal blank while maintaining said blank in confined condition and in intimate contact with the grooved and crested surface of said one member to cause said seal blank to remain in fixed position relative thereto.

11. The method of assembling a fluorocarbon seal element to one of the opposed surfaces of a piston member and a cylinder member comprising the steps of forming a plurality of axially spaced continuous V-shaped crest areas on a surface of one of said members, forming a plurality of axially spaced continuous V-shaped grooved areas on said surface and spaced alternately between said crest areas, forming a seal blank of fluorocarbon material dimensioned to be received by said grooved and crested surface, assembling said seal blank in overlying relation with said grooved and crested surface, heating said seal blank in overlying relation with said surface while applying a radial force to cause said seal blank partially to fill the grooves and causing said crests to be embedded in the material of said seal blank, cooling said seal blank while maintaining said blank in confined condition and in intimate contact with the grooved and crested surface of said one member, and assembling said piston and cylinder members with said seal element therebetween and affixed to said one surface whereby said crest and groove areas cooperating with said seal member on the other opposed surface to provide axially spaced continuous high and low pressure seal areas respectively.

12. The method of assembling a polytetrafluoroethylene seal element to the outer surface of a piston member adapted to be received by a cylinder member comprising the steps of forming a plurality of axially spaced continuous crest areas on the outer surface of at least a portion of said piston member, forming a plurality of grooved areas on said surface of said piston member, forming a relatively thin seal blank of polytetrafluoroethylene material dimensioned to be received by said grooved and crested surface of said piston member, assembling said seal blank in overlying relation with said grooved and crested surface of said piston member, heating and forcing said seal blank radially inwardly toward said grooved and crested surface of said piston by inserting the piston and assembled seal blank through a heated mandrel, the dimensions of said grooves, crests, piston, seal blank and mandrel being coordinated and correlated to cause said seal blank to fill the grooved areas partially while causing said crest areas to penetarte partially into said seal blank, and cooling said seal blank while maintaining said blank in confined condition on said piston and in intimate contact with the grooved and crested areas of said one piston.

13. The method of assembling a polytetrafluoroethylene seal element to the outer surface of a piston member adapted to be received by a cylinder member comprising the steps of forming a plurality of axially spaced continuous V-shaped crest areas on the outer surface of at least a portion of said piston member, forming a plurality of axially spaced continuous V-shaped grooved areas on said surface of said piston, said grooved areas being spaced between said crest areas, forming a seal blank of polytetrafluoroethylene material having a thickness between .010 and .050 inch and dimensioned to be received by said grooved and crested surface, assembling said seal blank in overlying relation with said grooved and crested surface of said piston, heating and forcing said seal blank radially inwardly by inserting said assembled seal blank and piston into a hollow heated mandrel having a diameter slightly less than the diameter of the cylinder into which said piston is received, the dimensions of said grooves, crests, piston and seal blank being coordinated and correlated to cause said seal blank partially to fill said groove areas while causing said crest areas to penetrate into said seal blank about 20% to 80% the cross-sectional thickness thereof, cooling said seal blank while in assembled confined condition on said piston, and assembling said piston with said seal member affixed to the outer surface thereof into a cylinder whereby said crest and groove areas cooperate with said seal blank and cylinder to provide axially spaced continuous high and low pressure seal areas respectively.

14. A piston and self-lubricating seal assembly comprising a piston having an outer cylindrical surface, a relatively thin sealing member of fluorocarbon material having a relatively low coefficient of friction overlying a portion of said piston surface to provide a continuous outer seal, said sealing member being secured against axial movement with respect to said piston surface, means integral with said piston surface for providing in cooperation with said sealing member a plurality of axially spaced generally annular high pressure sealing areas, and second means cooperating with said piston surface and said sealing member for providing spaced low pressure sealing areas and expansion spaces into which the material of said sealing member may move in response to increases in temperature.

15. A piston and self-lubricating seal assembly comprising a piston having an outer cylindrical surface, a plurality of alternate annular grooves and crests on at least a portion of said piston surface, said grooves and crests being V-shaped and continuous, a relatively thin sleeve of fluorocarbon material having a relatively low coefficient of friction overlying said grooved and crested surface of said piston, the surface of said sleeve facing said grooved and crested surface including a plurality of grooves receiving said crests of said piston surface, the crests in the surface of said sleeve being received in the grooves in said piston surface, the grooves in said piston surface including root portions spaced from the crests in said sleeve to provide a generally annular chamber for expansion of said fluorocarbon material due to increase in temperature thereof, the cross-sectional thickness dimension of said sleeve in the areas of said crests on said piston being greater than at least 20% of the thickness of the remaining portion of said sleeve, and said grooves and crests in said piston surface cooperating with the crests and grooves in said sleeve to provide annular spaced low and high pressure sealing areas respectively between said cylindrical surfaces while preventing axial movement of said sleeve with respect to said piston surface.

References Cited by the Examiner
UNITED STATES PATENTS

| | | | |
|---|---|---|---|
| 2,710,237 | 6/55 | Smith | 92—248 |
| 2,817,562 | 12/57 | Fleming | 92—155 |
| 2,885,105 | 5/59 | Heyl | 264—249 |
| 3,030,753 | 4/62 | Pennington | 92—155 |

KARL J. ALBRECHT, *Primary Examiner.*